(12) United States Patent
Wellmar

(10) Patent No.: US 6,447,215 B1
(45) Date of Patent: Sep. 10, 2002

(54) METHOD AND PLANT FOR PNEUMATIC TRANSPORT OF SOLID PARTICLES

(75) Inventor: Pär Wellmar, Västerhaninge (SE)

(73) Assignee: Fastighetsbolaget Axeln 5 AB, Trosa (SE)

( * ) Notice: Subject to any disclaimer, the term of this patent is extended or adjusted under 35 U.S.C. 154(b) by 0 days.

(21) Appl. No.: 09/581,540
(22) PCT Filed: Dec. 22, 1998
(86) PCT No.: PCT/SE98/02424
§ 371 (c)(1), (2), (4) Date: Jul. 10, 2000
(87) PCT Pub. No.: WO99/37565
PCT Pub. Date: Jul. 29, 1999

(30) Foreign Application Priority Data

Jan. 9, 1998 (SE) .............................................. 9800033

(51) Int. Cl.⁷ .............................................. B65G 51/02
(52) U.S. Cl. .............................. 406/11; 406/14; 406/16; 406/85; 406/122; 406/144
(58) Field of Search .............................. 406/11, 14, 16, 406/85, 122, 144

(56) References Cited

U.S. PATENT DOCUMENTS

| | | | |
|---|---|---|---|
| 3,979,152 A | | 9/1976 | Morey et al. .................. 302/17 |
| 4,009,912 A | * | 3/1977 | Mraz ........................... 302/25 |
| 4,502,819 A | * | 3/1985 | Fujii et al. .................... 406/14 |
| 4,662,799 A | * | 5/1987 | Paul et al. ..................... 406/14 |
| 4,802,796 A | * | 2/1989 | Brannstrom .................. 406/141 |
| 4,938,637 A | * | 7/1990 | Lybecker et al. .............. 406/56 |
| 5,092,526 A | * | 3/1992 | Takata .......................... 239/655 |
| 5,247,722 A | * | 9/1993 | Leifeld .......................... 19/105 |
| 5,593,252 A | * | 1/1997 | Relin et al. .................... 406/85 |
| 5,618,136 A | | 4/1997 | Smoot ........................... 406/93 |
| 5,813,061 A | * | 9/1998 | Tornqist ......................... 4/431 |
| 6,079,911 A | * | 6/2000 | Wangermann et al. ....... 406/132 |

FOREIGN PATENT DOCUMENTS

| | | |
|---|---|---|
| DE | 2 319 028 | 11/1973 |
| EP | 0 427 881 | 5/1991 |
| EP | 0 653 366 | 5/1995 |
| GB | 1 428 498 | 3/1976 |
| GB | 2 038 750 | 7/1980 |
| GB | 2 089 307 | 6/1982 |

\* cited by examiner

Primary Examiner—Christopher P. Ellis
Assistant Examiner—Rashmi Sharma
(74) Attorney, Agent, or Firm—Jacobson Holman, PLLC

(57) ABSTRACT

The present invention provides a method and plant for the pneumatic transportation of solid particles in the form of a diluted phase through a conduit (1), with which the transport air in said conduit is given a velocity which is at most equal to the air velocity chosen for a maximum particle load level. The free flow from the pressurized air source (3) is regulated on the basis of measured air velocity or on the basis of a state corresponding thereto, such as air pressure in the conduit, and an established relationship between the free flow and the said measured velocity of the air or a state (pressure) corresponding thereto, essentially independently of the particle load. There is thus maintained in the conduit a preferably constant transport air velocity with all different occurring levels of particle load.

19 Claims, 1 Drawing Sheet

METHOD AND PLANT FOR PNEUMATIC TRANSPORT OF SOLID PARTICLES

BACKGROUND OF THE INVENTION

1. Field of the Invention

The present invention relates generally to a method of transporting solid particles pneumatically. More specifically, the present invention relates to method for pneumatically transporting material in a form of solid particles in a diluted phase through a conduit in which a varying material load arises by the feeding of the particles into the conduit. The particles are driven along the conduit with the aid of an air flow delivered by a pressurized-air source located upstream of a material infeed position.

The invention also relates to a corresponding plant system for the pneumatic transportation of material in a form of solid particles in a diluted phase through a conduit. The conduit includes a material infeed device, and a pressurized-air source upstream of the infeed device.

2. Related Art

The transportation of solid particles, such as wood chips, for instance, through a tubular conduit with the aid of a pressurized gas flow, particularly a compressed-air flow, is well known to the art. In one specific transport situation, the plant is dimensioned so that the source of pressurised-air will generate a specific air velocity in the conduit at a chosen maximum load on the system. The plant is dimensioned on the basis of the density of the bulk material (which in the case of wood chips will depend on the type of wood concerned and its moisture content), the concentration of the bulk material, and particle size distribution (chips, bark, etc.).

Earlier known transport systems have therefore been designed to manage the worst conceivable case, i.e. the case of unfavourable size distribution, a high moisture content, the conceivably heaviest bulk material and highest bulk concentration. On this basis, the source of pressurised-air has been designed to generate an air velocity which will ensure correct pneumatic transportation of the solid particles in said conceivably "worse case" with a chosen safety margin. Should the air velocity in the conduit fall beneath a critical value with respect to the volume of material concerned fed into the conduit, the particle material will settle in the conduit and normally necessitate emptying the conduit system mechanically/manually before the transport system can be restarted. A consequence of this nature is, of course, very serious and consequently it has been elected in respect of known systems to operate the pressurised-air source in a manner to maintain a constant free air flow from said source. The source of pressurised-air is normally referred to as a blower, i.e. a positive displacement compressor, which is operated at a constant speed.

One drawback with pneumatic transport systems of the type indicated above is that they have a relatively high energy consumption.

SUMMARY OF THE INVENTION

Accordingly, one object of the present invention is to provide a method and plant which enable the energy consumption of the system to be restricted when the system is operated with a varying material load. Another object is to provide a simple method of adjustment which enables this reduction in energy consumption to be achieved. Another object is to provide simple means by means of which the pressurised-air source can be adjusted to enable said reduction in energy consumption to be achieved.

One or more of these objects is achieved totally or partially with a method by which material in a form of solid particles in a diluted phase is pneumatically transported through a conduit. A varying material is established by feeding the particles into the conduit in a varying amount and driving the particles along the conduit with aid of an air flow delivered by a pressurized-air source located upstream of a material infeed position, and a transport air velocity for a maximum material load on air flow.

On or more of these objects is achieved totally or partially with a plant by which material in a form of solid particles in a diluted phase is pneumatically transported through the conduit. The conduit includes a material infeed device, and a pressurized-air source upstream of the infeed device.

Further developments of the invention will be apparent from the method according to the step of adjusting the free flow of the transport air source to bring the real value of the velocity of the transport air flow or the detected state into line with the control value, to establish a transport air velocity which is essentially equal to the chosen transport air velocity for the maximum material load, even in those cases when material loads are lower than the chosen maximum material load.

The method further includes the steps of establishing a relationship which is essentially independent of the material load for the chosen transport air velocity and as a relationship between the free flow of the transport air source and a pressure of the transport air flow, and sensing the pressure in the transport air conduit.

The pressurized-air source includes a positive displacement compressor, wherein the compressor has a rotary pump element, and wherein the free flow of the pressurized-air source is regulated by regulating a rotary speed of the compressor, which draws in air at ambient pressure.

The method further includes the steps of driving the rotary pump element of the compressor with an aid of an asynchronous motor whose speed is dependent on a frequency of the supply current to the motor, regulating the frequency to regulate the free flow of the pressurized-air source, and establishing a relationship between the control pressure and the frequency.

The method includes the step of correcting the relationship on a basis of reading off pump curves for the compressor.

Additionally, the method comprises the step of correcting the relationship with respect to air flow temperatures upstream and downstream of the compressor.

In the plant system of the present invention, a pressurized air source includes a positive displacement compressor and a rotatable drive shaft. The free flow delivered by the compressor varies linearly with a rotary speed. In that sensing member is for sensing a transport air pressure, and a relationship is established between the rotary speed of the compressor and the sensed pressure.

The compressor is driven by an asynchronous motor whose speed varies linearly with the frequency of a motor supply current. A frequency converter is connected between the asynchronous motor and a power source, and a frequency converter is controlled by a control member on a basis of a sensed pressure, wherewith a relationship is established between frequency and pressure, and the free flow of the pressurized air source corresponds to a frequency generated by the frequency converter.

The pressure can be measured readily and safely in the transport conduit and is dependent on the material load.

Consequently, it is not necessary to measure the varying amount of material fed into the conduit. A simple relationship can be established between the free flow from said pressurised-air source and the detected/sensed pressure under certain conditions, such that the velocity of the transporting air will be constant with respect to different occurring material loads.

The free flow from said pressurised-air source is proportional to the rotary speed of a positive displacement blower used as said source. The rotary speed of the blower corresponds to the driving frequency of an asynchronous motor used to operate the blower. This frequency can easily be sensed. The frequency can also readily be controlled with the aid of a converter. It is also possible to establish the relationship between the frequency and control pressure, or set-point pressure, in the conduit. A control pressure can thus be calculated on the basis of the frequency sensed/detected and the frequency then adjusted to correspond to the control pressure.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The invention will now be described in more detail with reference to an exemplifying embodiment and also with reference to the accompany figures, in which.

DESCRIPTION OF THE INVENTION

Figure 1:
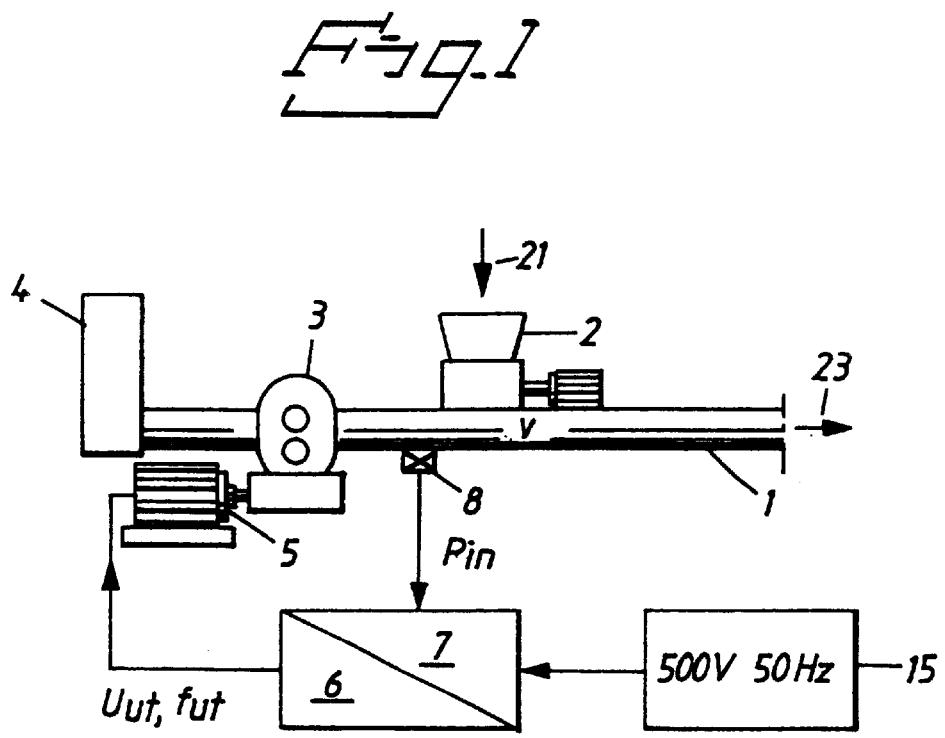
FIG. 1 is a schematic illustration of an inventive plant.

Although only one preferred embodiment of the invention is explained in detail, it is to be understood that other embodiments are possible. Accordingly, it is not intended that the invention is to be limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

The plant includes a conduit 1 in which solid particles move in the direction of arrow 23. The conduit includes an infeed device 2 for the infeed of solid particles 21 to be transported in the direction of flow 23. Arranged upstream of the infeed device is a source of pressurised-air which includes a blower 3, i.e. a compressor. Ambient air is allowed to enter the upstream end of the conduit 1, via a silencer 4. The blower 3 is a positive displacement blower and may comprise a screw compressor whose free flow is determined by the speed at which the screws rotate. The blower 3 is rotated by an asynchronous motor 5. Current is supplied to the motor 5 from switch gear via a frequency converter 6 which supplies the motor 5 with a frequency controlled by a control system 7. The control system 7 receives information from one or more pressure sensors 8 arranged in the conduit 1 to sense the pressure in said conduit, preferably in the region between the blower 3 and the material infeed device 2. The volume of material delivered to the system via the infeed device 2 defines a load level. In the case of the illustrated embodiment, the velocity of the air moving through the conduit system is kept constant for the different load levels that occur.

It can be assumed that the conduit has the same cross-sectional area both upstream and downstream of the blower, so that the air velocities v1 and v2 can be calculated directly. The blower inlet pressure p1 is set for instance to 101.3 kPA (normal air pressure). Vi will keep v2 as the velocity for which the system was once designed, e.g. a velocity of 33 m/sec. The following values are applicable to the system:

| p1 = 101.3 | [kpa] | p2 = p | [kPa] |
|---|---|---|---|
| v1 = constant*f1 | [m/s] | v2 = 33 | [m/s] |
| T1 = T | [K] | T2 = T + dT | [K] |

In this case, the speed n is a linear function of the frequency f1. Assume that general gas laws apply:

$$\frac{pV}{T} = \text{constant}$$

We describe below three cases with reference to different assumptions:

Case 1. Assume that the temperature dependency is weak, T1=T1=T, and that v1 is directly proportional to the rotational speed as described above==>

$$p_2 = p_1 \frac{v_1}{v_2} = p_1 \frac{\text{constant} \cdot f_1}{v_2} = k_1 f_1$$

since p1 and v2 are constants. k1 can now be easily determined with data relating to a typical system, e.g. when n=629 rpm at 50 Hz with p2=150 kPa.==>k1=3.

Figure 2:
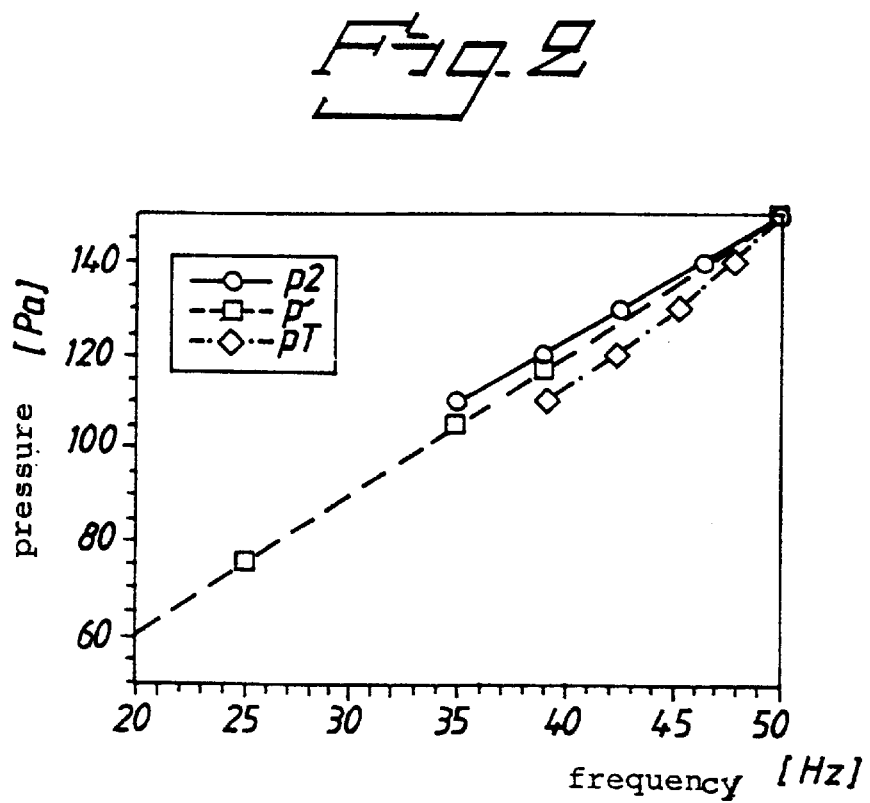
FIG. 2 illustrates the relationship between pressure and frequency.

The drawing shows this simple relationship p' which applies approximately at a constant velocity v2=33 m/s (broken line—squares in FIG. 2).

Case 2. Still assume that the temperature dependency is weak, T1=T2=T, and determine v1 as a function of f1 by reading directly from pump curves for the blower concerned. In the case in question, the relationship p2 shown in FIG. 2 by the full line containing circles is obtained.

Case 3. "Precise" determination of the relationship that applies to the system. Constant speed v2=33 m/s. Include the temperature T through pV/T=constant, data from pump curves included. Temperature. The relationship between p2 and f1 is given in this case by pT, (shown in FIG. 2 by a broken line that contains rhomboids).

It should be observed that when we directly choose implementation with Case 1–p', the actual velocity at f1=50 Hz will, of course, be v2=33 m/s as it should be. At p2=116.5, f1=38.9 the actual velocity is v2=30.97. The system will herewith run at an idling speed in principle.

In practical embodiments, several pressure sensors 8 are arranged in the conduit, so as to be on the safe side. The rotary speed of the asynchronous motor may generally vary in the range of (1.0:0.5) times its normal speed, i.e. the frequency can vary from 25–50 Hz since the switch gear normally delivers 50 Hz. The minimum frequency of 25 Hz is then determined with regard to safety against thermal fatigue and storage currents in respect of the asynchronous motor.

An important feature of the invention is that the air velocity in the conduit can be kept constant without needing to measure the velocity directly and without needing to measure the instantaneous material load on the system. By measuring the real pressure and calculating a control (set point) pressure, it is possible to calculate with the aid of a relationship the free flow that the blower 3 needs to deliver in order to sustain the velocity in the conduit 1. In the illustrated configuration, this flow can be easily controlled, by setting the asynchronous motor to a corresponding operating frequency, said control frequency being calculated on the basis of the pressure control value determined.

Control Method

| Variables | $P_{br}$ pressure-control value | [kPa] |
|---|---|---|
| | $P_{in}$ pressure-sensed | [kPa] |
| | $F_1$ frequency in question | [Hz] |
| | $F_{br}$ control frequency | [Hz] |
| | damp damping factor | [-] |
| | $U_{in}$ current-read | [mA] |
| Constants | $C_1 = 76.3$ | |
| | $C_2 = 6.25$ | |
| System | $d_1 = \text{Real} > 0$ | |
| | $k_1 = \text{Real} > 0$ | |
| | $F_{1off} = \text{Real} > 0$ | |
| Equation 1. | $P_{in} = C_1 + C_2 * U_{in}$ | |
| Equation 2. | $P_{br} = d_1 * (k_1 * F_1 - (101.3 - F_{1off}))$ | |
| Sequence | S1 Read off $P_1$ (equation 1) | |
| | S2 Read off $F_1$ (frequency concerned) | |
| | S3 Determine $P_{br}$ (equation 2) | |
| | S4 temp 1: = abs($P_{br} - P_{in}$); | |
| | =0: $F_{br}: = F_1$ | |
| | >0: $F_{br}: = F_1 - F_1$ (temp1/damp) ; [reduce the frequency] | |
| | <0: $F_{br}: = F_1 + F_1$ (temp1/damp) ; [increase frequency] | |
| | S5 Back to S1 | |
| Equation 1. | $P_{in} = C_1 + C_2 * U_{in}$ | |
| Equation 2. | $P_{br} = d_1 * (k_1 * F_1' (101.3 - F_{1off}))$ | |

In Equation 2 above, k1 is determined, in principle, from the original system operating data at maximum load. All systems are designated in the main, so that p2=150 kPa at maximum load; f1 is, of course, 50 Hz in the absence of a frequency adjustment. The parameters F1 off and d1 are used to adjust a p-f relationship which lies closer to, e.g., the "true curve" or a drift which is better from some other aspect.

An alternative to the aforedescribed regulating method is one in which an attempt is made to detect or sense the air velocity in the conduit 1 directly and to adjust the blower to maintain this air velocity even when the material loaded via the infeed device 2 falls beneath the maximum value for which the chosen transport velocity has been selected.

The velocity of the air in the conduit 1 can also be determined by measuring temperature changes of the air, i.e. by measuring the temperature of the air upstream and downstream of the blower.

It has been assumed in the illustrated case that the drive motor of the blower is an asynchronous motor, so that the blower inlet velocity will be directly proportional to the frequency. It will be understood, however, that the pressurized-air source may have a different form.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A method of pneumatically transporting material in a form of solid particles in a diluted phase through a conduit, wherein a varying material loading of transportation flow exists, and driving said particles along said conduit with an air flow delivered by a pressurized-air source located upstream of a material infeed position, and a transport air velocity is chosen for a maximum material load on said air flow, the method comprising the steps of:

establishing for a selected transport air velocity a relationship between a free flow of said pressurized-air source and a velocity of a transport air flow, or a state of said transport air flow corresponding thereto;

detecting said velocity of said transport air flow, or a state of said transport air flow corresponding thereto;

detecting said free flow of said pressurized-air source either directly or indirectly;

calculating a control value with respect to said velocity of said transport air, or with respect to said state of said transport air flow corresponding thereto, and said relationship; and adjusting said free air flow from said pressurized-air source to bring a real value of said velocity of said transport air flow, or said detected state, into line with said control value, to establish an operable transport air velocity which is at most substantially equal to a chosen transport air velocity for said maximum material load, even when material loads are lower than said maximum material load.

2. The method according to claim 1, and further comprising the step of:

adjusting said free flow of said transport air source to bring said real value of said velocity of said transport air flow or said detected state into line with said control value, to establish a transport air velocity which is essentially equal to said chosen transport air velocity for said maximum material load, even when material loads are lower than the chosen maximum material load.

3. The method according to claim 1, and further comprising the steps of:

establishing a relationship which is essentially independent of said material load for said chosen transport air velocity and as a relationship between said free flow of said transport air source and a pressure of said transport air flow; and sensing said pressure in the said transport air conduit.

4. The method according to claim 3, wherein said pressurized-air source includes a positive displacement compressor, said compressor has a rotary pump element, and said free flow of pressurized-air source is regulated by regulating a rotary speed of said compressor, which draws in air at ambient pressure.

5. The method according to claim 4, and further comprising the steps of:

driving said rotary pump element of said compressor with an asynchronous motor whose speed is dependent on a frequency of the supply current to said motor; and regulating said frequency to regulate said free flow of said pressurized-air source; and establishing a relationship between said control pressure and said frequency.

6. The method according to claim 1, and further comprising the step of:

correcting said relationship on a basis of reading off pump curves for said compressor.

7. The method according to claim 6, and further comprising the step of:

correcting said relationship with respect to air flow temperatures upstream and downstream of said compressor.

8. A plant for pneumatic transportation of material in a form of solid particles in a diluted phase through a conduit, said conduit including a material infeed device, and a pressurized-air source upstream of said infeed device, said plant comprising:

means for establishing a chosen transport air velocity for a chosen maximum material load on said system and, for said chosen transport air velocity, a relationship between a free flow of a transport air source and a velocity of said transport air flow, or a state of said transport air flow corresponding thereto, said relationship being essentially independent of said material load;

means for detecting said transport air flow with respect to velocity, or with respect to said state;

means for detecting said free flow of said pressurized-air source either directly or indirectly;

means for calculating with said relationship a control value for said transport air velocity or said state of said transport air flow, corresponding to said free flow of said pressurized-air source; and means for adjusting said free flow of said transport air source to bring a real value of said velocity of said transport air or said detected state to said control value and establish an operable transport air velocity which is at most generally equal to said chosen transport air velocity for said maximum material load, even when material loads are lower than said chosen maximum material load.

9. The plant according to claim 8, wherein said pressurized-air source includes a positive displacement compressor and a rotatable drive shaft, and said free flow delivered by said compressor varies linearly with a rotary speed; and further comprising sensing means for sensing a transport air pressure and a relationship is established between said rotary speed of said compressor and said sensed transport air pressure.

10. The plant according to claim 9, wherein said compressor is driven by an asynchronous motor whose speed varies linearly with said frequency of a motor supply current, a frequency converter is connected between said asynchronous motor and a power source, and a frequency converter is controlled by control means on a basis of a sensed pressure, wherewith a relationship is established between frequency and pressure, and wherewith said free flow of said pressurized-air source corresponds to a frequency generated by said frequency converter.

11. The method according to claim 1, wherein said step of establishing said selected transport air velocity is essentially independent of the material load.

12. A plant for pneumatically transporting material in a form of solid particles in a diluted phase through a conduit, wherein a varying material loading of transportation flow exists, and driving said particles along said conduit with an air flow delivered by a pressurized-air source located upstream of a material infeed position, and a transport air velocity is chosen for a maximum material load on said air flow, said plant comprising:

means for establishing a selected transport air velocity a relationship between a free flow of said pressurized-air source and a velocity of a transport air flow, or a state of said transport air flow corresponding thereto;

means for detecting said velocity of said transport air flow, or a state of said transport air flow corresponding thereto;

means for detecting said free flow of said pressurized-air source either directly or indirectly;

means for calculating a control value with respect to said velocity of said transport air, or with respect to said state of said transport air flow corresponding thereto, and said relationship; and means for adjusting said free air flow from said pressurized-air source to bring a real value of said velocity of said transport air flow, or said detected state, into line with said control value, to establish an operable transport air velocity which is at most substantially equal to a chosen transport air velocity for said maximum material load, even when material loads are lower than said maximum material load.

13. The plant according to claim 12, and further comprising:

means for adjusting said free flow of said transport air source to bring said real value of said velocity of said transport air flow or said detected state into line with said control value, to establish a transport air velocity which is essentially equal to said chosen transport air velocity for said maximum material load, even when material loads are lower than the chosen maximum material load.

14. The plant according to claim 12, and further comprising:

means for establishing a relationship which is essentially independent of said material load for said chosen transport air velocity and as a relationship between said free flow of said transport air source and a pressure of said transport air flow; and sensing said pressure in the said transport air conduit.

15. The plant according to claim 14, wherein said pressurized-air source includes a positive displacement compressor, said compressor has a rotary pump element, and said free flow of pressurized-air source is regulated by regulating a rotary speed of said compressor, which draws in air at ambient pressure.

16. The plant according to claim 15, and further comprising:

means for driving said rotary pump element of said compressor with an asynchronous motor whose speed is dependent on a frequency of the supply current to said motor; and means for regulating said frequency to regulate said free flow of said pressurized-air source; and means for establishing a relationship between said control pressure and said frequency.

17. The plant according to claim 1, and further comprising:

means for correcting said relationship on a basis of reading off pump curves for said compressor.

18. The plant according to claim 17, and further comprising:

means for correcting said relationship with respect to air flow temperatures upstream and downstream of said compressor.

19. The plant according to claim 12, wherein said establishing said selected transport air velocity is essentially independent of the material load.

* * * * *